United States Patent
Duale et al.

(10) Patent No.: US 10,289,529 B2
(45) Date of Patent: May 14, 2019

(54) TESTING A GUARDED STORAGE FACILITY

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); Mohammed Shammas, Bangalore (IN); Dennis W. Wittig, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 15/416,105

(22) Filed: Jan. 26, 2017

(65) Prior Publication Data

US 2018/0210816 A1   Jul. 26, 2018

(51) Int. Cl.
*G06F 11/36* (2006.01)
*G06F 12/02* (2006.01)

(52) U.S. Cl.
CPC ...... *G06F 11/3664* (2013.01); *G06F 11/3688* (2013.01); *G06F 11/3692* (2013.01); *G06F 12/0253* (2013.01); *G06F 2212/1032* (2013.01)

(58) Field of Classification Search
CPC ............. G06F 11/3688; G06F 11/3692; G06F 11/3644; G06F 11/3636
See application file for complete search history.

(56) References Cited

U.S. PATENT DOCUMENTS

| | | | |
|---|---|---|---|
| 9,075,851 B2 | 7/2015 | Kilian et al. | |
| 2006/0085156 A1* | 4/2006 | Kolawa | G06F 12/0253 702/119 |
| 2010/0031239 A1* | 2/2010 | Keromytis | G06F 11/3688 717/128 |
| 2013/0124470 A1 | 5/2013 | Kesselman et al. | |
| 2014/0245074 A1* | 8/2014 | Duale | G06F 11/3644 714/45 |
| 2015/0212751 A1 | 7/2015 | Shi et al. | |
| 2015/0347137 A1 | 12/2015 | Gschwind et al. | |

* cited by examiner

*Primary Examiner* — Jigar P Patel
(74) *Attorney, Agent, or Firm* — Cantor Colburn LLP; Teddi Maranzano

(57) ABSTRACT

A computer-implemented method includes executing one or more test programs on a computing device, where the computing device includes a Guarded Storage (GS) facility managing use of GS. Each test program of the one or more test programs comprises a respective GS event, and each respective GS event prompts execution of a respective garbage reclaim function associated with the GS. A memory storage is analyzed, by a computer processor, to verify expected operation of each of the one or more test programs. Test results of the one or more test programs are determined based on the analyzing the memory storage. A remedial action is performed in response to the test results of the one or more test programs.

20 Claims, 10 Drawing Sheets

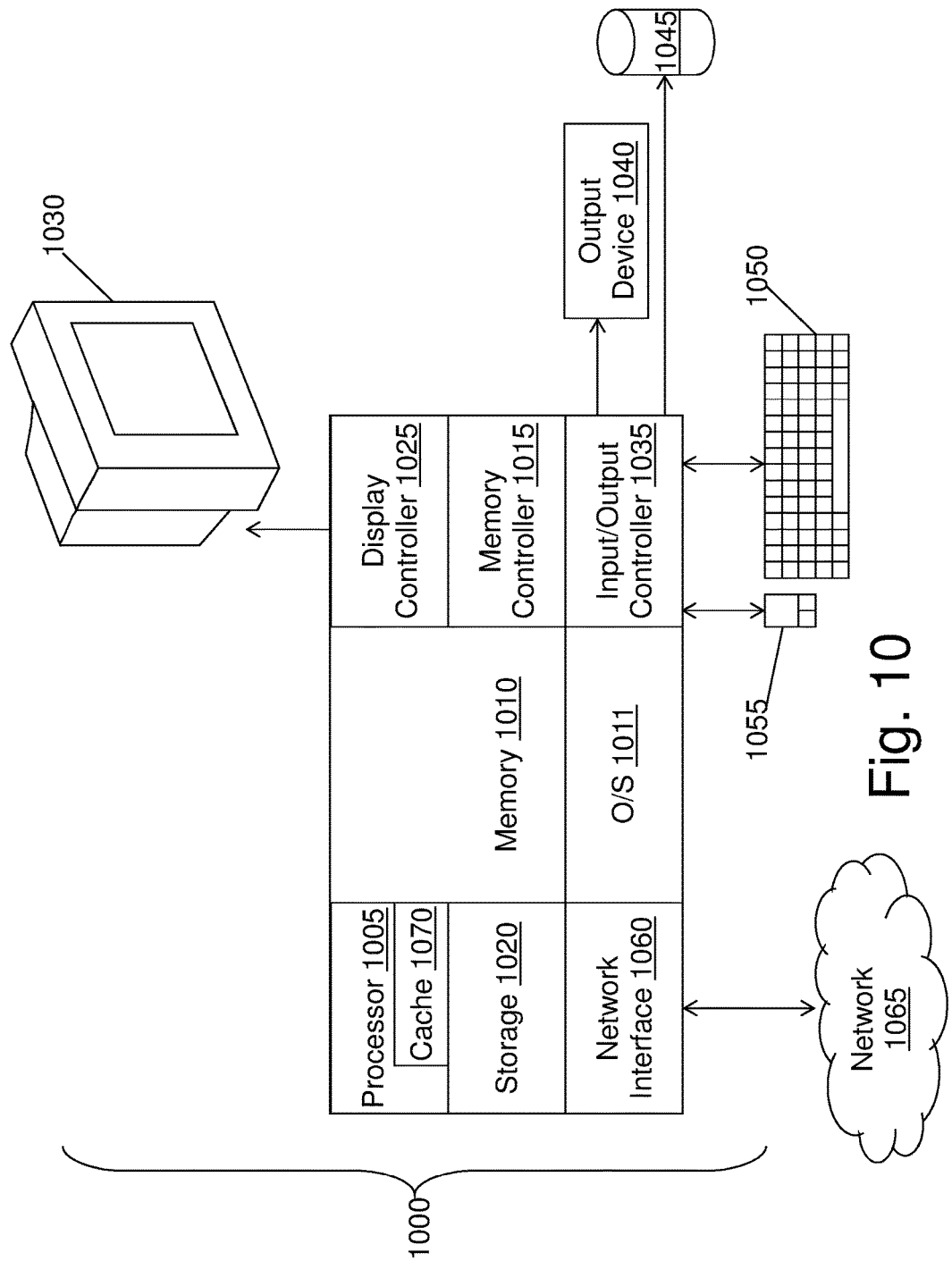

TESTING A GUARDED STORAGE FACILITY

BACKGROUND

Embodiments of the present invention relate to system testing and, more specifically, to testing a Guarded Storage facility.

During execution of a Java program, the Java runtime collects the program's garbage, which is made up of memory objects that are deemed to be no longer in use. If these unused memory objects are not freed and released for reuse, the program can continue consuming more and more resources unchecked. This can slow down the computer system on which the program runs, and can reduce resources available to the program and other applications running on the computer system.

Guarded Storage is a facility incorporated into the z System® of International Business Machines®. With Guarded Storage, memory objects that are no longer needed are periodically made available for reuse.

SUMMARY

According to an embodiment of this invention, a computer-implemented method includes executing one or more test programs on a computing device, where the computing device includes a Guarded Storage (GS) facility managing use of GS. Each test program of the one or more test programs comprises a respective GS event, and each respective GS event prompts execution of a respective garbage reclaim function associated with the GS. A memory storage is analyzed, by a computer processor, to verify expected operation of each of the one or more test programs. Test results of the one or more test programs are determined based on the analyzing the memory storage. A remedial action is performed in response to the test results of the one or more test programs.

In another embodiment, a system includes a memory having computer-readable instructions and one or more processors for executing the computer-readable instructions. The computer-readable instructions include executing one or more test programs on a computing device, where the computing device includes a GS facility managing use of GS. Each test program of the one or more test programs comprises a respective GS event, and each respective GS event prompts execution of a respective garbage reclaim function associated with the GS. Further according to the computer-readable instructions, a memory storage is analyzed to verify expected operation of each of the one or more test programs. Test results of the one or more test programs are determined based on the analyzing the memory storage. A remedial action is performed in response to the test results of the one or more test programs.

In yet another embodiment, a computer program product for testing Guarded Storage includes a computer-readable storage medium having program instructions embodied therewith. The program instructions are executable by a processor to cause the processor to perform a method. The method includes executing one or more test programs on a computing device, where the computing device includes a GS facility managing use of GS. Each test program of the one or more test programs comprises a respective GS event, and each respective GS event prompts execution of a respective garbage reclaim function associated with the GS. Further according to the method, a memory storage is analyzed to verify expected operation of each of the one or more test programs. Test results of the one or more test programs are determined based on the analyzing the memory storage. A remedial action is performed in response to the test results of the one or more test programs.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 10 is a block diagram of a computer system for implementing some or all aspects of the test system, according to some embodiments of this invention.

DETAILED DESCRIPTION

The Guarded Storage (GS) facility is critical in that it frees up resources for use within a computing device. However, it is also critical to ensure that GS, which is managed by the GS facility, is operating as expected on each computing device in which it is incorporated. Given that GS is a relatively new technology, there is no conventional mechanism for testing GS to ensure it operates properly.

Turning now to an overview of aspects of the present invention, some embodiments of a test system provide a test mechanism to verify the functionality of a GS architecture in a virtual environment. In some embodiments, the test system applies to computer systems, such as the z System, that use Guarded Storage in virtual environments. The test system may operate with or without the use of Transactional Execution (TX) and Runtime Instrumentation (RI), which are additional facilities that may be incorporated into systems using GS.

Figure 1:
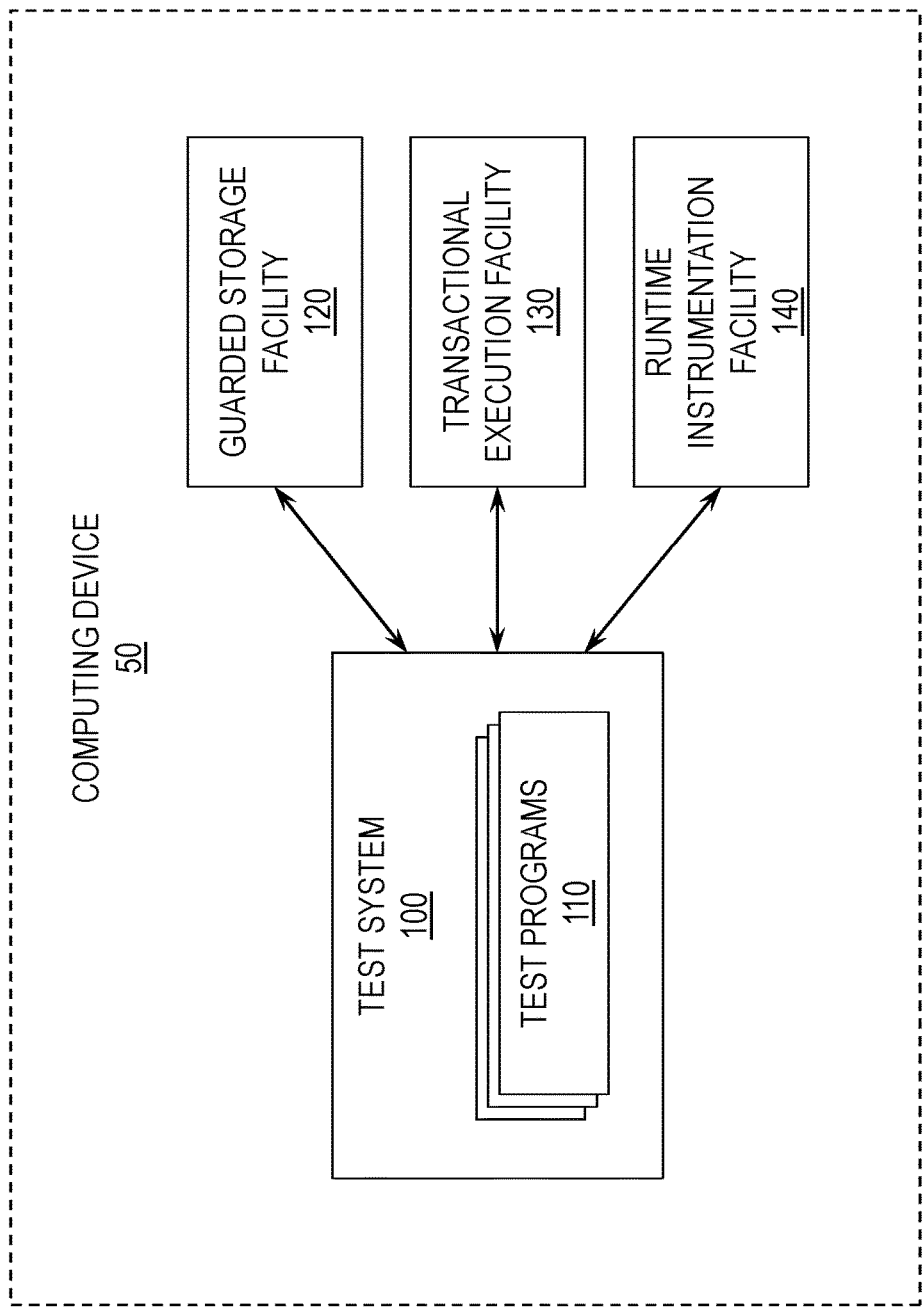
FIG. 1 is a block diagram of a test system for verifying functionality of Guarded Storage on a computing device, according to some embodiments of this invention.

FIG. 1 is a diagram of the test system 100 for verifying functionality of GS on a computing device 50, according to some embodiments of this invention. As shown in FIG. 1, the test system 100 may include one or more test programs 110, executable on the computing device 50 to verify that GS, and thus the GS facility 120, is operating properly on the computing device 50. In some embodiments, the test programs 110 of the test system 100 may be executable within a virtual machine of the computing device 50, to verify that GS is operating properly within a virtual environment of the computing device 50. Example test programs 110 of the test system 100 will be described in detail below.

Generally, GS is activated by first loading GS enablement controls onto the computing device 50 being tested, such as by calling a GS load instruction to load GS-control. Additionally, a GS parameter storage area may be initialized and may include a GS event handler. When GS is active, a GS instruction encountered in a running program acts as a GS event, which causes a branch from the program into the GS event handler, which calls a reclaim function for the GS facility 120. In some embodiments, the reclaim function executes code of the GS facility 120 for releasing unused memory, and then returns control back to the running program.

In the test system 100, according to some embodiments, the running program is a test program 110 designed to test the functionality of GS. In the test programs 110 described below, these operations to initialize GS before running the test program 110 may be performed unless otherwise indicated. Results of each test program 110 may be available to the test system 100, which may verify that GS is behaving as expected. For example, the results may be changes in memory of the computing device 50, such that certain changes or lack of changes may be expected in the case of proper operation of GS. In some embodiments, verification may be performed automatically by the test system 100, when the test system 100 is aware of expected memory changes due to proper operation. Alternatively, however, verification may be performed manually and may be entered into the test system 100.

In some embodiments, the test system 100 may implement test programs 110 to verify proper operation of one or more of the following: standalone GS, GS interaction with the TX facility 130, GS interaction with the RI facility 140, GS interaction with both TX and RI, and adverse conditions of GS. It will be understood that an embodiment of the test system 100 may include one or more of the test programs 110 described below, and need not include every test program 110 described herein.

Figure 2:
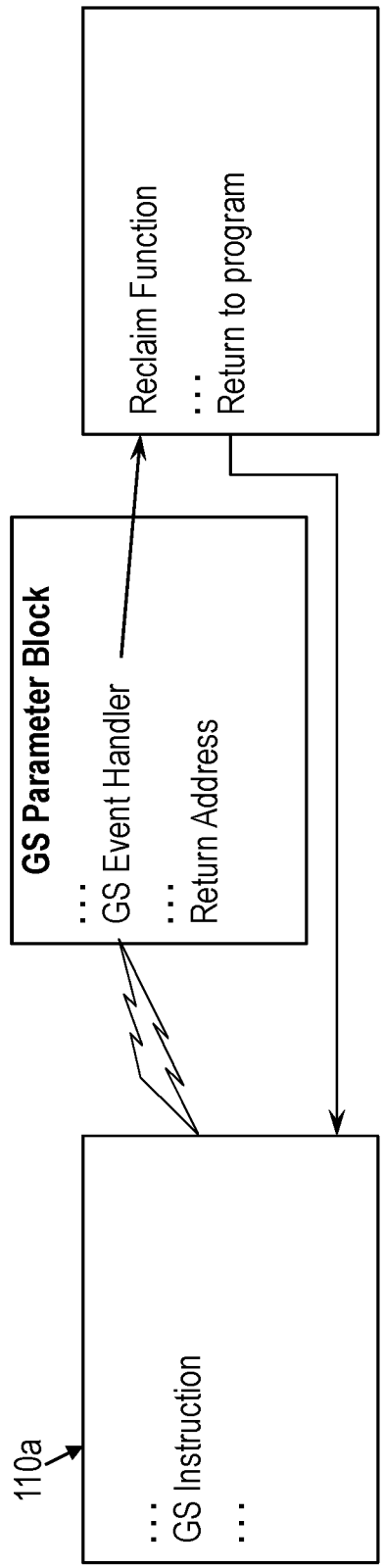
FIG. 2 is a block diagram of a first test program of the test system, according to some embodiments of this invention.

In some embodiments, the test system 100 may include a first test program used to verify proper operation of the standalone GS. FIG. 2 is a block diagram of the first test program 110a, according to some embodiments. The first test program 110a may include a GS instruction, which may be followed by another instruction used to verify that a GS event occurred with the GS instruction. For instance, this other instruction may be notification code, which may be designed to notify when the program does not branch to the GS event handler and, thus, when no GS event GS event occurred. After execution of the first test program 110a, the test system 100 may verify that the GS event occurred.

Figure 3:
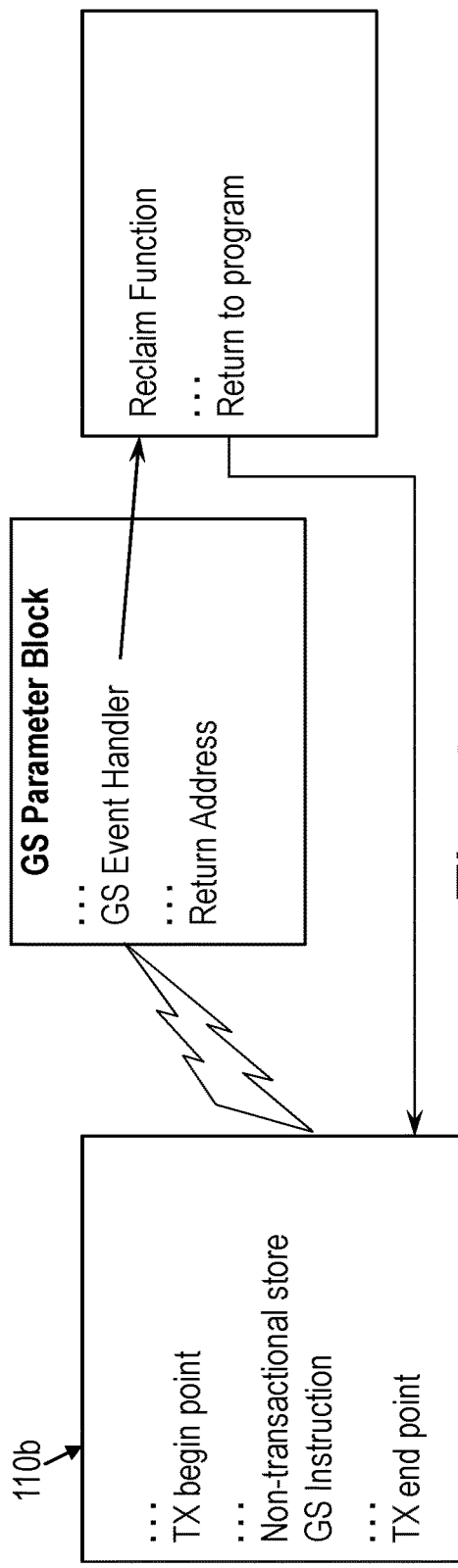
FIG. 3 is a block diagram of a second test program of the test system, according to some embodiments of this invention.

In some embodiments, the test system 100 may include a second test program used to verify that GS operates properly when used in conjunction with TX. FIG. 3 is a block diagram of the second test program 110b, according to some embodiments. Generally, TX is a facility that enables operations within transactional code to be performed atomically without another processor (i.e., other than the one executing the transactional code) accessing the memory referenced in the transactional code. With TX, a begin point and an end point of transactional code are specified in a program, and the program attempts to execute all the code between the begin point and the end point atomically. If the transactional code cannot be completed, then the TX facility generally reverts memory affected by all the executed instructions since the begin point and aborts the transactional code, indicating a failure. The second test program 110b may then reattempt the transaction code, once again starting from the begin point. Generally, however, a store operation within transactional code may be specified as a non-transactional store. Unlike other instructions in the transactional code, a non-transactional store is generally not reverted after an abort. The second test program 110b may verify that a non-transactional store within transactional code was executed and was not reversed, regardless of failure to complete the transactional code.

Specifically, for instance, the second test program 110b may include transactional code, marked by a begin point and an end point, and that transactional code may include a non-transactional store as well as a GS instruction following the non-transactional store. The expected behavior may be that the GS event handler is initiated, and a branch is taken to the reclaim function when the GS instruction is encountered as part of the transactional code. However, due to the GS event, the transactional code is unable to complete, and therefore aborts. In some embodiments, the transactional code returns a GS abort code recognizable by the test system 100. Memory affected by the transactional code may be reverted, with the exception of the non-transactional store. The test system 100 may then verify that the memory modified by the transactional store retained the changes made by the transactional store, and may further verify that other changes to memory by the transactional code were reverted.

Figure 4:
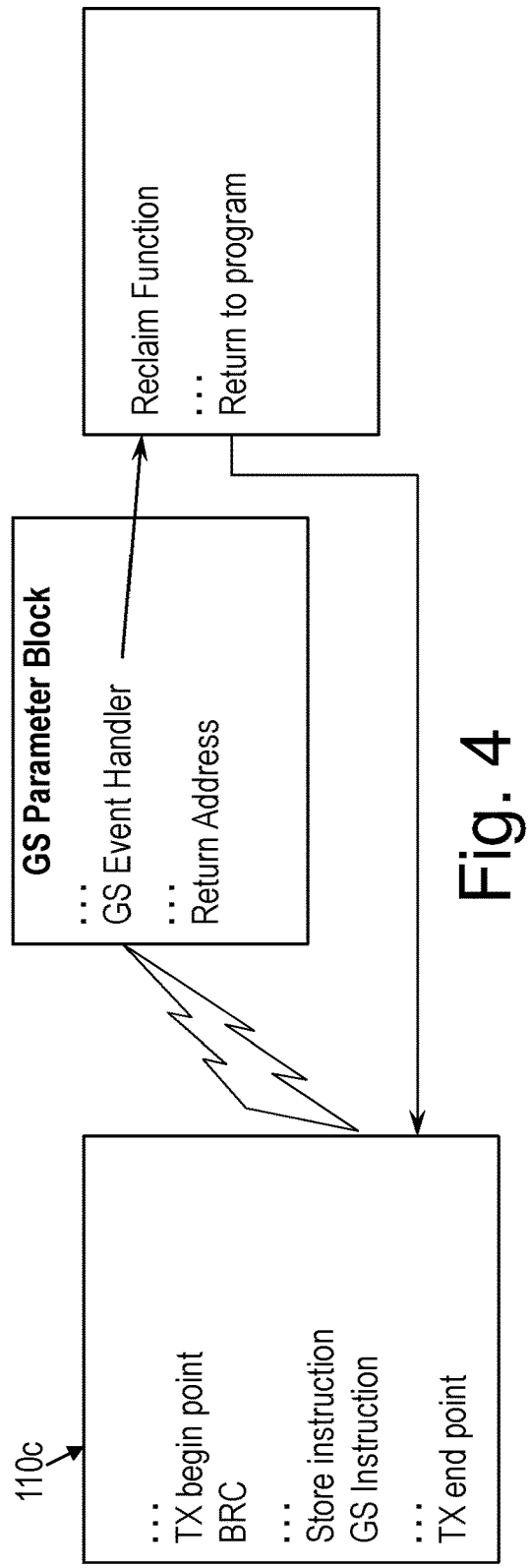
FIG. 4 is a block diagram of a third test program of the test system, according to some embodiments of this invention.

In some embodiments, the test system 100 may include a third test program, also for testing operation of the GS in conjunction with TX. FIG. 4 is a block diagram of the third test program 110c, according to some embodiments. Specifically, the third test program 110c may be used to verify that storage reverts to its previous state on abortion of transactional code. The third test program 110c may include transactional code, which may include a GS instruction as well as one or more store operations that are not non-transactional stores. Further, the third test program 110c may include a branch relative on condition (BRC) instruction immediately after the begin point of the transactional code. The expected behavior of the third test program 110c in some embodiments is to branch to the reclaim function upon recognizing the GS event. However, in some embodiments, when a GS event occurs, the GS instruction is expected to cause an abort of the transactional code. In some embodiments, this is expected to result in an abort code indicating an unknown abort. After execution of the reclaim function, execution may return to the BRC. After execution of the third test program 110c, the test system 100 may verify that the operations occurred as expected.

Figure 5:
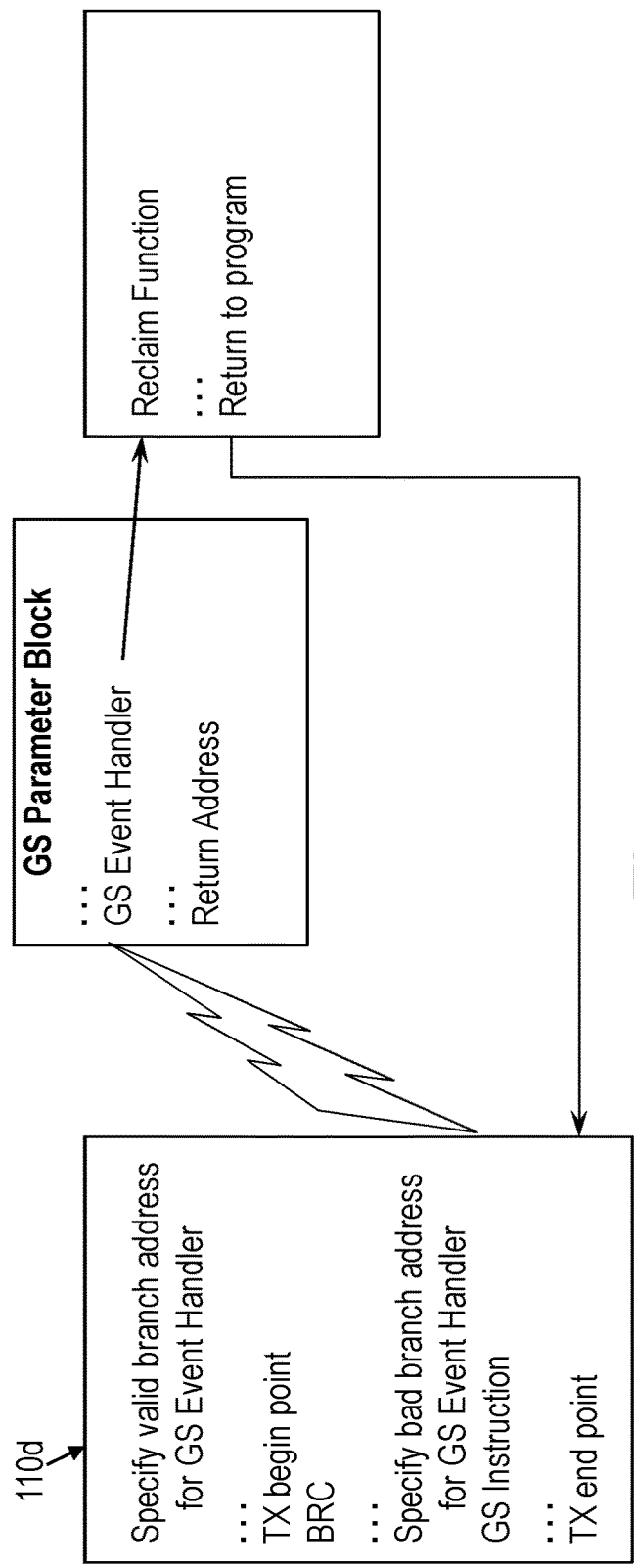
FIG. 5 is a block diagram of a fourth test program of the test system, according to some embodiments of this invention.

In some embodiments, the test system 100 may include a fourth test program, which may be used to verify that storage is restored, and thus that any operations of the transactional code are reversed, upon an abort from the transactional code. FIG. 5 is a diagram of the fourth test program 110d, according to some embodiments of this invention. As shown in FIG. 5, the fourth test program 110d may initially specify a valid branch address to the GS event handler before the begin point of the transactional code. A BRC instruction may immediately follow the begin point. Later in the transactional code, a bad branch address to the GS event handler may be specified, followed by a GS instruction. After execution of the fourth test program 110d, the test system 100 may verify that the bad branch address is not taken, while the valid branch address is. The test system 100 may additionally verify that the memory storage reverts back to its state prior to the transactional code being entered, since the execution of the transactional code may be expected to abort due to the GS instruction.

Figure 6:
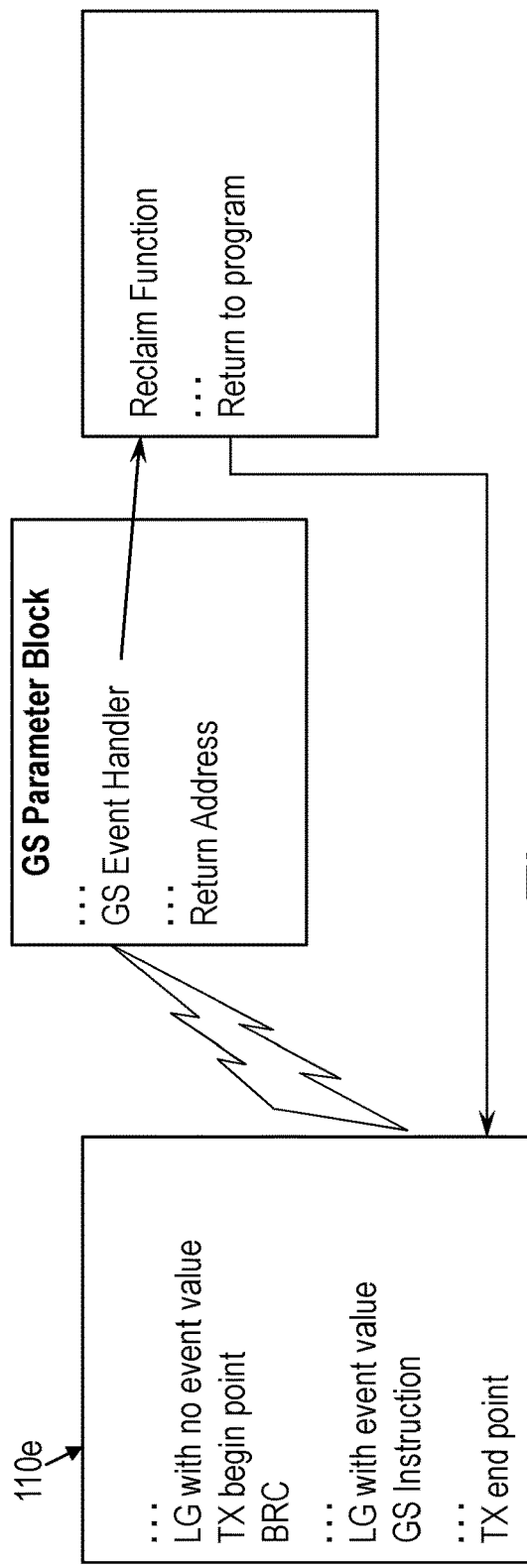
FIG. 6 is a block diagram of a fifth test program of the test system, according to some embodiments of this invention.

In some embodiments, the test system 100 includes a fifth test program. FIG. 6 is a block diagram of the fifth test program 110e, according to some embodiments. The fifth test program 110e may be used to verify that general purpose registers are restored, when applicable, upon abortion of the transactional code. The fifth test program 110e may include, in order as shown in FIG. 6, a load register (LG) with no event value, a begin point for transactional code, a BRC instruction, an LG with an event value, and then a GS instruction. If behaving as expected, a GS event (i.e., the GS instruction) may cause the transactional code to abort. In some embodiments, this leads to an abort code indicating an unknown abort. Upon reaching the GS instruction, the processing may branch to the reclaim function. After execution of the reclaim function, processing may continue at the BRC instruction. The test system 100 may verify that the execution of the fifth test program 110e proceeds as described above.

Figure 7:
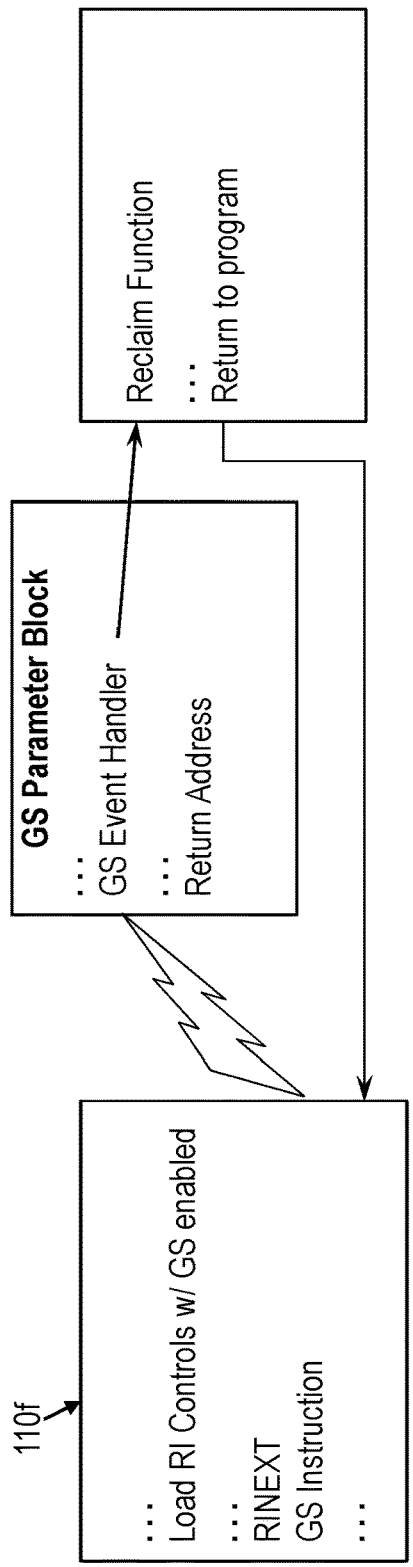
FIG. 7 is a block diagram of a sixth test program of the test system, according to some embodiments of this invention.

In some embodiments, the test system 100 includes a sixth test program to verify that RI and GS work as expected in conjunction with each other. FIG. 7 is a block diagram of the sixth test program 110f, according to some embodiments. Generally, RI enables recording of instructions performed following an RINEXT instruction. Such recordings are saved for later use in accordance with the RI implementation. The sixth test program 110f may be used by the test system 100 to verify that RI recording of GS operations behaves as expected. As shown in FIG. 7, the RI controls may be loaded into the system. In some embodiments, an RINEXT instruction and the GS instruction may be ordered back to back in the sixth test program 110f. After running the sixth test program 110f, the test system 100 may verify that RI recorded the GS event.

Figure 8:
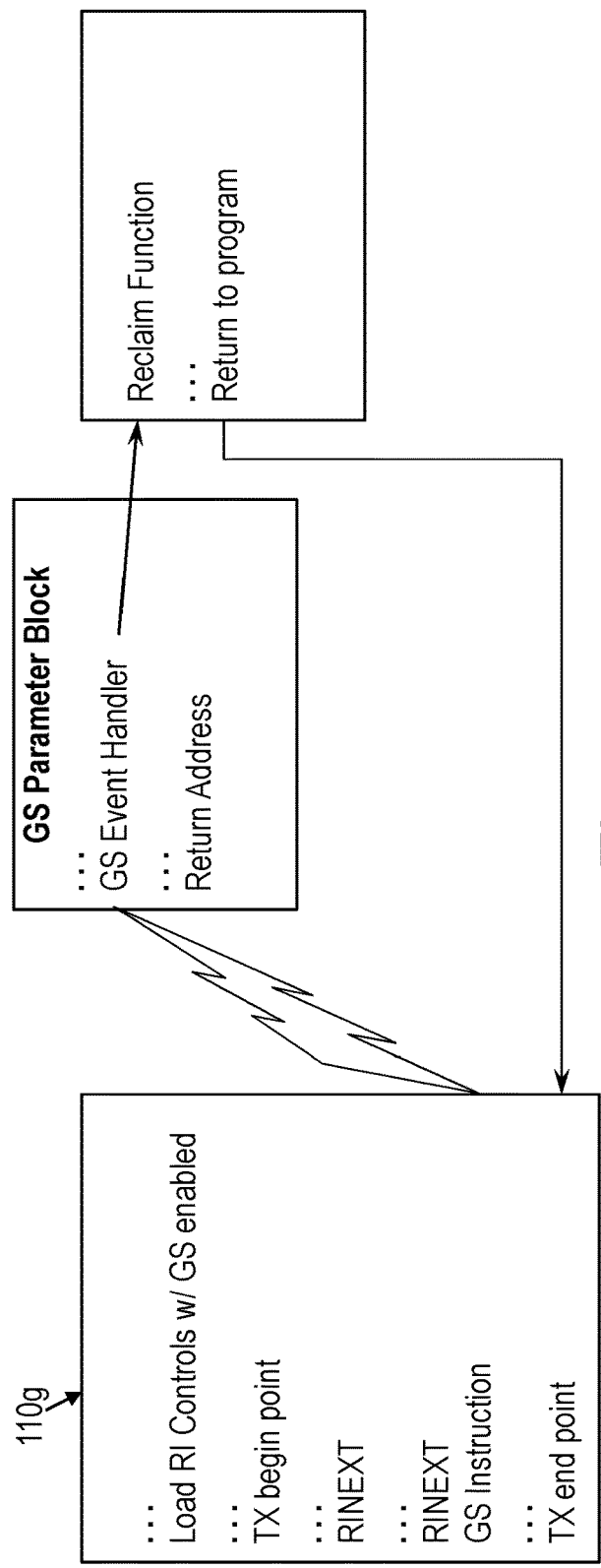
FIG. 8 is a block diagram of a seventh test program of the test system, according to some embodiments of this invention.

In some embodiments, the test system 100 includes a seventh test program also used to verify that RI and GS work as expected in conjunction with each other. FIG. 8 is a block diagram of the seventh test program 110g, according to some embodiments of this invention. The seventh test program 110g may be used by the test system 100 to verify that GS, TX, and RI operate as expected in conjunction with one another. Generally, when transactional code within a begin point and a respective end point includes multiple RINEXT instructions, only the first of such instructions within that transactional code may result in a recording. In other words, all but the first RINEXT instruction within a segment of transactional code are generally ignored. However, according to the expected operation, RI may be implemented to record the operation of GS instructions, even when those GS instructions appear within the transactional code. Specifically, the seventh test program 110g may be used to verify that a GS instruction within transactional code is recorded by RI, when that GS instruction is not the first indicated RI recording within the transactional code. As shown in FIG. 8, two RINEXT instructions may be included in the seventh test program 110g, with the second one appearing directly before a GS instruction. After execution of the seventh test program 110g, the test system 100 may verify that the GS event corresponding to the GS instruction was recorded using RI.

Figure 9:
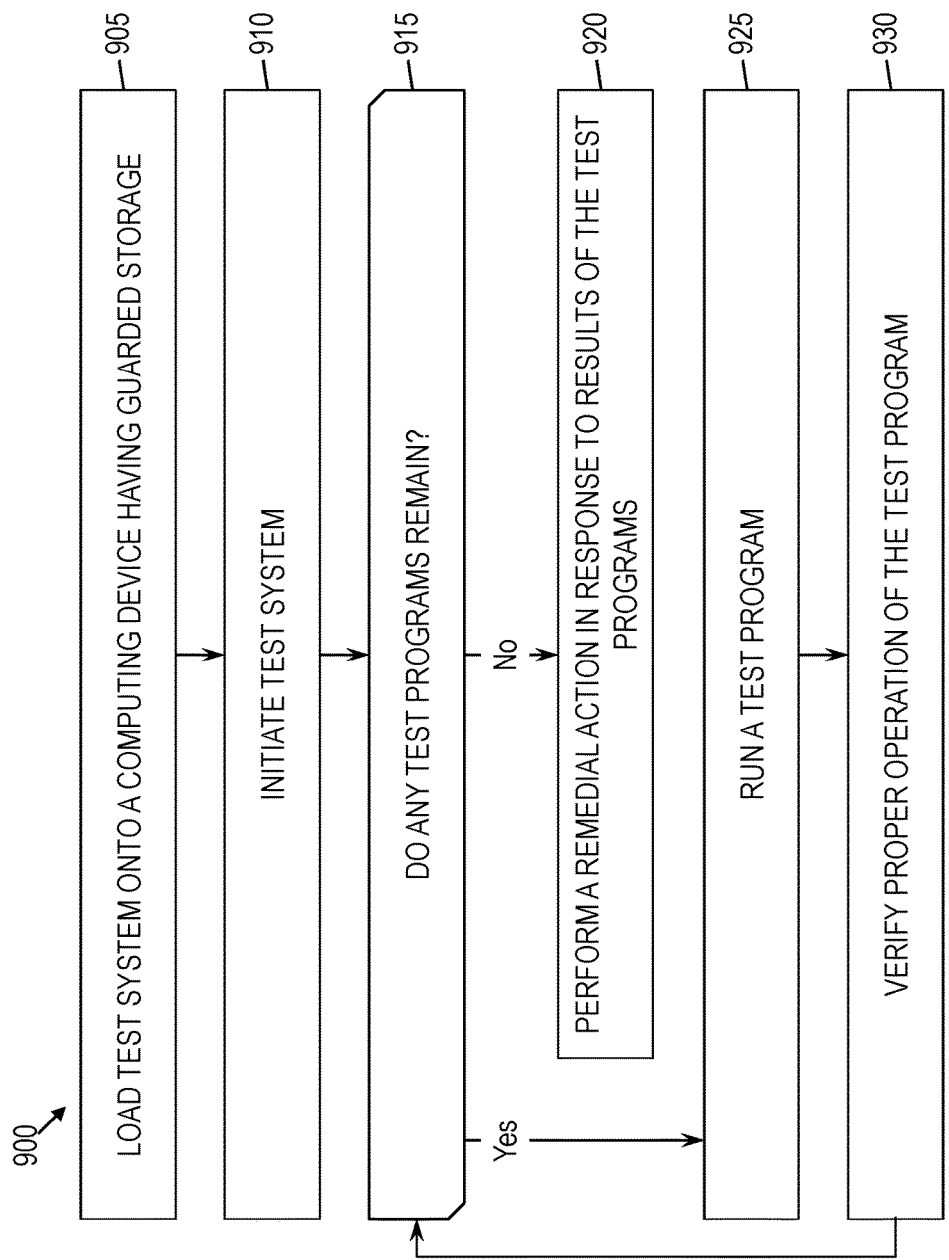
FIG. 9 is a flow diagram of a method for testing Guarded Storage functionality on a computing device, according to some embodiments of this invention.

FIG. 9 is a flow diagram of a method 900 for testing GS functionality on a computing device 50, according to some embodiments of this invention. As shown in FIG. 9, at block 905, the test system 100 may be loaded onto a computing device 50 having GS. In some embodiments, the computing device 50 may be a new computer system, such as a z System, and the test system 100 may be used to verify operation of GS on the computing device 50 before the computing device 50 is sold or otherwise released for use. At block 910, the test system 100 may be initiated by the computing device 50. At decision block 915, the test system 100 may determine whether any test programs 110 are available to be run on the computing device 50. In some embodiments, this determination may be performed automatically by the test system 100, such as by determining whether any test programs 110 applicable to the computing device 50 have not yet been run on the computing device 50. Alternatively, however, a user may manually determine whether an additional test program 110 is to be run, and the test system's determination may thus be based on user entry. If no test programs 110 remain to be run at decision block 915, then the method may end at block 920 by automatically performing a remedial action on the computing device 50 in response to the results of the test programs 110. In some embodiments, such a remedial action may include reporting errors or indicating progress, or both, that occurred through running the test programs 110.

If a test program 110 is identified at decision block 915 as not yet having been run, then at block 925, the test system 100 may run that test program 110. For example, and not by way of limitation, the test program 110 may be one of those described above. At block 930, after running the test program 110, the test system 100 may verify proper operation of the test program 110. In other words, the test system 100 may determine whether the test program 110 ran as expected. In some embodiments, the test system 100 may be aware of the expected results and may thus perform this verification automatically. Alternatively, however, manual verification may be received by the test system 100. The method 900 may then return to decision block 915 to determine whether additional test programs 110 remain to be run.

FIG. 10 illustrates a block diagram of a computer system 1000 for use in implementing a test system 100 or method according to some embodiments. The test systems 100 and methods described herein may be implemented in hardware, software (e.g., firmware), or a combination thereof. In some embodiments, the methods described may be implemented, at least in part, in hardware and may be part of the microprocessor of a special or general-purpose computer system 1000, such as a personal computer, workstation, minicomputer, or mainframe computer. For instance, the computing device 50 on which the test system 100 runs test programs 110 may be a computer system 1000 as shown in FIG. 10.

In some embodiments, as shown in FIG. 10, the computer system 1000 includes a processor 1005, memory 1010 coupled to a memory controller 1015, and one or more input devices 1045 and/or output devices 1040, such as peripherals, that are communicatively coupled via a local I/O controller 1035. These devices 1040 and 1045 may include, for example, a printer, a scanner, a microphone, and the like. Input devices such as a conventional keyboard 1050 and mouse 1055 may be coupled to the I/O controller 1035. The I/O controller 1035 may be, for example, one or more buses or other wired or wireless connections, as are known in the art. The I/O controller 1035 may have additional elements, which are omitted for simplicity, such as controllers, buffers (caches), drivers, repeaters, and receivers, to enable communications.

The I/O devices 1040, 1045 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1005 is a hardware device for executing hardware instructions or software, particularly those stored in memory 1010. The processor 1005 may be a custom made or commercially available processor, a central processing unit (CPU), an auxiliary processor among several processors associated with the computer system 1000, a semiconductor based microprocessor (in the form of a microchip or chip set), a macroprocessor, or other device for executing instructions. The processor 1005 includes a cache 1070, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1070 may be organized as a hierarchy of more cache levels (L1, L2, etc.).

The memory 1010 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, or other types of storage media. Note that the memory 1010 may have a distributed architecture, where various components are situated remote from one another but may be accessed by the processor 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011. The operating system 1011 essentially may control the execution of other computer programs and provides scheduling, input-output control, file and data management, memory management, and communication control and related services.

Additional data, including, for example, instructions for the processor 1005 or other retrievable information, may be stored in storage 1020, which may be a storage device such as a hard disk drive or solid state drive. The stored instructions in memory 1010 or in storage 1020 may include those enabling the processor to execute one or more aspects of the test systems 100 and methods of this disclosure.

The computer system 1000 may further include a display controller 1025 coupled to a display 1030. In some embodiments, the computer system 1000 may further include a network interface 1060 for coupling to a network 1065. The network 1065 may be an IP-based network for communication between the computer system 1000 and an external server, client and the like via a broadband connection. The network 1065 transmits and receives data between the computer system 1000 and external systems. In some embodiments, the network 1065 may be a managed IP network administered by a service provider. The network 1065 may be implemented in a wireless fashion, e.g., using wireless protocols and technologies, such as WiFi, WiMax, etc. The network 1065 may also be a packet-switched network such as a local area network, wide area network, metropolitan area network, the Internet, or other similar type of network environment. The network 1065 may be a fixed wireless network, a wireless local area network (LAN), a wireless wide area network (WAN) a personal area network (PAN), a virtual private network (VPN), intranet or other suitable network system and may include equipment for receiving and transmitting signals.

Test systems 100 and methods according to this disclosure may be embodied, in whole or in part, in computer program products or in computer systems 1000, such as that illustrated in FIG. 10.

Technical effects and benefits of some embodiments include the ability to test a computing device 50 to verify operation of GS and, thus, to determine whether it will operate as intended for a user. Specifically, the test system 100 may run various test programs 110 with code designed to provide verifiable changes in memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    initializing a Guarded Storage (GS) event handler on a computing device, wherein the computing device comprises a GS facility managing use of GS, and wherein the GS event handler is configured to reclaim memory of the computing device;
    executing one or more test programs on the computing device, wherein each test program of the one or more test programs comprises a respective GS event, and wherein each respective GS event prompts execution of a garbage reclaim function associated with the GS, and wherein executing a first test program of the one or more test programs comprises:
    executing one or more instructions of the first test program;
    encountering a GS instruction in the first test program;
    branching to the GS event handler, responsive to encountering the GS instruction in the first test program; and
    executing a memory reclaim function, by the GS event handler, to execute code to release unused memory;
analyzing, by a computer processor, a memory storage to verify expected operation of each of the one or more test programs;
determining test results of the one or more test programs based on the analyzing the memory storage; and
performing a remedial action in response to the test results of the one or more test programs.

2. The computer-implemented method of claim 1, further comprising:
    verifying, through the first test program of the one or more test programs, occurrence of the respective GS event of the first test program.

3. The computer-implemented method of claim 1, wherein the first test program of the one or more test programs comprises transactional code to be performed atomically, and wherein the transactional code comprises a non-transactional store and the respective GS event of the first test program, and further comprising:
    verifying, through the first test program, occurrence of the respective GS event within the transactional code of the first test program; and
    verifying, through the first test program, that the non-transactional store is not reversed by abortion of the transactional code.

4. The computer-implemented method of claim 1, wherein the first test program of the one or more test programs comprises transactional code to be performed atomically, and wherein the transactional code comprises the respective GS event of the first test program, and further comprising:
    verifying, through the first test program, occurrence of the respective GS event of the first test program; and
    verifying, through the first test program, that the memory storage is reverted to a state existing prior to processing of the transactional code.

5. The computer-implemented method of claim 1, further comprising:
    verifying, through the first test program of the one or more test programs, that a Runtime Instrumentation (RI) recording instruction prompts recording of the respective GS event of the first test program.

6. The computer-implemented method of claim 1, wherein the first test program of the one or more test programs comprises transactional code to be performed atomically, and further comprising:
    verifying, through the first test program, that a second RI recording instruction prompts recording of the respective GS event of the first test program, wherein the second RI recording instruction occurs inside the transactional code and after a first RI recording instruction that occurs inside the transactional code.

7. The computer-implemented method of claim 1, wherein the remedial action comprises reporting the test results of the one or more test programs.

8. A system comprising:
a memory having computer readable instructions; and
one or more processors for executing the computer-readable instructions, the computer readable instructions comprising:
    initializing a Guarded Storage (GS) event handler on a computing device, wherein the computing device comprises a GS facility managing use of GS, and wherein the GS event handler is configured to reclaim memory of the computing device;
    executing one or more test programs on the computing device, wherein each test program of the one or more test programs comprises a respective GS event, and wherein each respective GS event prompts execution of a garbage reclaim function associated with the GS, and wherein executing a first test program of the one or more test programs comprises:
        executing one or more instructions of the first test program;
        encountering a GS instruction in the first test program;
        branching to the GS event handler, responsive to encountering the GS instruction in the first test program; and
        executing a memory reclaim function, by the GS event handler, to execute code to release unused memory;
    analyzing a memory storage to verify expected operation of each of the one or more test programs;
    determining test results of the one or more test programs based on the analyzing the memory storage; and
    performing a remedial action in response to the test results of the one or more test programs.

9. The system of claim 8, the computer-readable instructions further comprising:
    verifying, through the first test program of the one or more test programs, occurrence of the respective GS event of the first test program.

10. The system of claim 8, wherein the first test program of the one or more test programs comprises transactional code to be performed atomically, and wherein the transactional code comprises a non-transactional store and the respective GS event of the first test program, and the computer-readable instructions further comprising:
    verifying, through the first test program, occurrence of the respective GS event within the transactional code of the first test program; and
    verifying, through the first test program, that the non-transactional store is not reversed by abortion of the transactional code.

11. The system of claim 8, wherein the first test program of the one or more test programs comprises transactional code to be performed atomically, and wherein the transactional code comprises the respective GS event of the first test program, and the computer-readable instructions further comprising:
    verifying, through the first test program, occurrence of the respective GS event of the first test program; and
    verifying, through the first test program, that the memory storage is reverted to a state existing prior to processing of the transactional code.

12. The system of claim 8, the computer-readable instructions further comprising:
    verifying, through the first test program of the one or more test programs, that a Runtime Instrumentation (RI) recording instruction prompts recording of the respective GS event of the first test program.

13. The system of claim 8, wherein the first test program of the one or more test programs comprises transactional code to be performed atomically, and the computer-readable instructions further comprising:

verifying, through the first test program, that a second RI recording instruction prompts recording of the respective GS event of the first test program, wherein the second RI recording instruction occurs inside the transactional code and after a first RI recording instruction that occurs inside the transactional code.

14. The system of claim 8, wherein the remedial action comprises reporting the test results of the one or more test programs.

15. A computer-program product for testing Guarded Storage, the computer program product comprising a computer-readable storage medium having program instructions embodied therewith, the program instructions executable by a processor to cause the processor to perform a method comprising:

initializing a Guarded Storage (GS) event handler on a computing device, wherein the computing device comprises a GS facility managing use of GS, and wherein the GS event handler is configured to reclaim memory of the computing device;

executing one or more test programs on the computing device, wherein each test program of the one or more test programs comprises a respective GS event, and wherein each respective GS event prompts execution of a garbage reclaim function associated with the GS, and wherein executing a first test program of the one or more test programs comprises:

executing one or more instructions of the first test program;

encountering a GS instruction in the first test program;

branching to the GS event handler, responsive to encountering the GS instruction in the first test program; and executing a memory reclaim function, by the GS event handler, to execute code to release unused memory;

analyzing a memory storage to verify expected operation of each of the one or more test programs;

determining test results of the one or more test programs based on the analyzing the memory storage; and performing a remedial action in response to the test results of the one or more test programs.

16. The computer-program product of claim 15, the method further comprising:

verifying, through the first test program of the one or more test programs, occurrence of the respective GS event of the first test program.

17. The computer-program product of claim 15, wherein the first test program of the one or more test programs comprises transactional code to be performed atomically, and wherein the transactional code comprises a non-transactional store and the respective GS event of the first test program, and the method further comprising:

verifying, through the first test program, occurrence of the respective GS event within the transactional code of the first test program; and verifying, through the first test program, that the non-transactional store is not reversed by abortion of the transactional code.

18. The computer-program product of claim 15, wherein the first test program of the one or more test programs comprises transactional code to be performed atomically, and wherein the transactional code comprises the respective GS event of the first test program, and the method further comprising:

verifying, through the first test program, occurrence of the respective GS event of the first test program; and verifying, through the first test program, that the memory storage is reverted to a state existing prior to processing of the transactional code.

19. The computer-program product of claim 15, the method further comprising:

verifying, through the first test program of the one or more test programs, that a Runtime Instrumentation (RI) recording instruction prompts recording of the respective GS event of the first test program.

20. The computer-program product of claim 15, wherein the first test program of the one or more test programs comprises transactional code to be performed atomically, and the method further comprising:

verifying, through the first test program, that a second RI recording instruction prompts recording of the respective GS event of the first test program, wherein the second RI recording instruction occurs inside the transactional code and after a first RI recording instruction that occurs inside the transactional code.

* * * * *